(No Model.)
J. P. EASLEY.
Car Coupling.
No. 232,809. Patented Oct. 5, 1880.
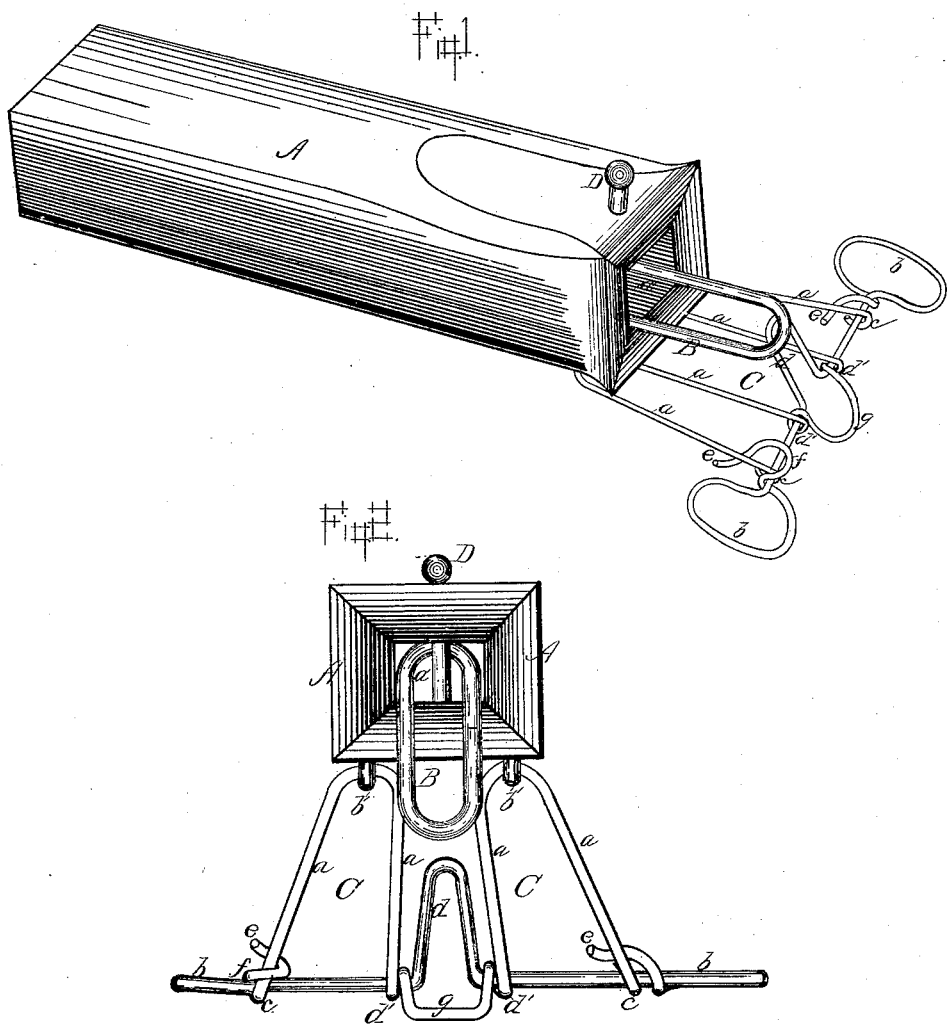
WITNESSES.
Will R. Onohundro.
Lou S. Thadwick.
INVENTOR
John P Easley
By Myers & Co
ATTORNEYS.
N. PETERS, PHOTO-LITHOGRAPHER, WASHINGTON, D. C.

UNITED STATES PATENT OFFICE.

JOHN P. EASLEY, OF HARRISONVILLE, KENTUCKY.

CAR-COUPLING.

SPECIFICATION forming part of Letters Patent No. 232,809, dated October 5, 1880.

Application filed March 4, 1880. (No model.)

*To all whom it may concern:*

Be it known that I, JOHN P. EASLEY, of Harrisonville, in the county of Shelby and State of Kentucky, have invented certain new and useful Improvements in Car-Couplings; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates to an improvement in car-couplings or link-adjusters for railroad-cars; and it consists in the pivoted arms or supports $a\ a$, the handles $b\ b$, the loop $d$, fenders $e\ e$, and loop $f$, in connection with the link B, coupling-pin D in draw-head A, and in the combination and arrangement thereof, as hereinafter more specifically set forth.

In the drawings, Figure 1 is a view, in perspective, of my device; and Fig. 2 is a front view, showing the link-adjuster in relation to the draw-head and suspended vertically.

A represents an ordinary draw-head for railroad-cars, having the recess $a'$, with coupling-pin D projecting vertically through it. B marks an ordinary coupling-link secured by the coupling-pin D.

C represents the link-adjuster, which is pivoted or hinged by the staples $b'$, in order that when not employed it may swing freely in a vertical line out of reach of contact with the cars, as shown in Fig. 2.

The link-adjuster C is made preferably of two heavy strands of wire. The arms or supports $a\ a$ provide bearings for the handles $b\ b$, and are secured by the staples $b'$, each end of the strand of which they are composed being bent into eyes $d'\ d'$ for reception of the handles $b\ b$, and each arm being additionally provided with the eyes $c\ c$, also for reception of the handles $b\ b$. The same strand which forms the arms after encircling the handle $b$ at $d'$ is also curved into the semicircle $g$, which latter is designed to admit the unimpeded action of the loop $d$.

The handle $b$ is constructed of a strand of wire bent into a bow or circle at either end and into the loop $d$ at its center. Its ends, respectively, are projected beneath the outer strand of the arms $a\ a$, and thus are formed into fenders $e\ e$ and loop $f$, which come in contact with the said arms when the loop or tongue $d$ is thrown into a vertical position, as shown in Fig. 2, or horizontal position, as shown in Fig. 1, the rotation of the handle $b$ in the eyes $c\ c$ being free and adjusted by said fenders to admit the loop $d$ being thrown into a vertical position, and the loop $f$ and fender $e$ prevent the handle $b$ from being rotated in an opposite direction, and the loop $d$ being thus thrown out of position for the intended work.

The operation is as follows: The link-adjuster C is drawn into a horizontal position, and the handle thereof then revolved until the link B is elevated into a vertical position.

What I claim is—

1. The arms or supports $a\ a$, attached to draw-head A by staples $b'\ b'$, in combination with handle $b$ and loop $d$ for adjusting link B, substantially as shown, and for the purpose described.

2. The link-adjuster C, suspended to draw-head A by its arms or supports $a\ a$, and staples $b'\ b'$ for adjusting the link B by means of handles $b$ and loop $d$, for coupling, substantially as shown, and for the purpose described.

3. The combination of the arms or supports $a\ a$, pivoted and adjusted by the staples $b'\ b'$ to the draw-head A, and handles $b\ b$, and loop $d$, pivoted in the eyes $d'\ d'$, substantially as shown and described.

4. The combination of the arms or supports $a\ a$, eyes $d'\ d'$ and $c\ c$, handle $b$, fenders $e\ e$, and loop $f$, substantially as shown and described.

In testimony that I claim the foregoing as my own I affix my signature in presence of two witnesses.

JOHN PRESTON EASLEY.

Witnesses:
  JEROME T. SAMPSON,
  WILLIAM S. STONE.